United States Patent
Bakodledis

(10) Patent No.: US 6,644,645 B2
(45) Date of Patent: Nov. 11, 2003

(54) STACK CONTROL MECHANISM

(75) Inventor: Andrew Bakodledis, Chester, CT (US)

(73) Assignee: GBR Systems Corporation, Chester, CT (US)

(*) Notice: Subject to any disclaimer, the term of this patent is extended or adjusted under 35 U.S.C. 154(b) by 105 days.

(21) Appl. No.: 10/041,985

(22) Filed: Jan. 10, 2002

(65) Prior Publication Data

US 2003/0127789 A1 Jul. 10, 2003

(51) Int. Cl.$^7$ ............................................. B65H 85/00
(52) U.S. Cl. ............................................. 271/3.17
(58) Field of Search ............... 271/3.01, 3.14, 271/3.03, 3.05, 3.12, 23, 35, 131, 3.06, 3.13, 9.06, 111, 227, 258.01, 3.15, 3.17, 3.09, 256; B65H 5/22, 83/00, 85/00, 3/30, 3/04, 3/24, 3/44, 2/08, 2/02, 2/00

(56) References Cited

U.S. PATENT DOCUMENTS

| | | |
|---|---|---|
| 3,809,907 A | 5/1974 | Schuller |
| 4,358,960 A | 11/1982 | Porter |
| 4,484,734 A | 11/1984 | Tsudaka |
| 4,503,960 A | 3/1985 | Koeleman |
| 4,530,593 A | 7/1985 | Kasuya |
| 4,566,547 A | 1/1986 | Furukawa |
| 4,576,472 A | 3/1986 | Ito |
| 4,734,747 A | 3/1988 | Okuda |
| 4,763,889 A | 8/1988 | Dei |
| 4,974,019 A | 11/1990 | Nishioka |
| 5,177,545 A | 1/1993 | Kato |
| 5,347,350 A | 9/1994 | Nakahata |
| 5,364,085 A | * 11/1994 | Kennish .................. 270/58.02 |
| 5,397,118 A | 3/1995 | Iida |
| 5,453,825 A | 9/1995 | Lipiz |
| 5,525,809 A | 6/1996 | Bolea |
| 5,574,551 A | 11/1996 | Kazakoff |
| 5,622,268 A | 4/1997 | Conner |
| 5,732,307 A | 3/1998 | Yoshizuka |
| 5,769,408 A | 6/1998 | Selak |
| 5,825,497 A | 10/1998 | Kim |
| 5,839,015 A | 11/1998 | Faguy |
| 5,897,112 A | 4/1999 | Kwag |
| 6,000,871 A | 12/1999 | Fisher |
| 6,038,028 A | 3/2000 | Grann |
| 6,076,824 A | * 6/2000 | Oppliger et al. ............ 271/150 |
| 6,367,793 B1 | * 4/2002 | O'Dea et al. ............ 270/52.09 |
| 2001/0052669 A1 | * 12/2001 | Bakoledis |

FOREIGN PATENT DOCUMENTS

EP  0 945 377 A2  * 9/1999  ............ B65H/3/06

* cited by examiner

Primary Examiner—Donald P. Walsh
Assistant Examiner—Kenneth Bower
(74) Attorney, Agent, or Firm—Joseph J. Previto

(57) ABSTRACT

A stack control mechanism comprising a mechanism for feeding and accumulating sheets to an accumulating area. A control mechanism for controlling the feeding of the sheets to the accumulating area which includes emitting an impulse or vibration onto that stack ad receiving vibrations or impulses which are reflected from the stack. The feeding mechanism is responsive to the controlling mechanism to adjust to rate of feeding of sheets to the accumulating area.

6 Claims, 1 Drawing Sheet

STACK CONTROL MECHANISM

BACKGROUND

Figure 1:
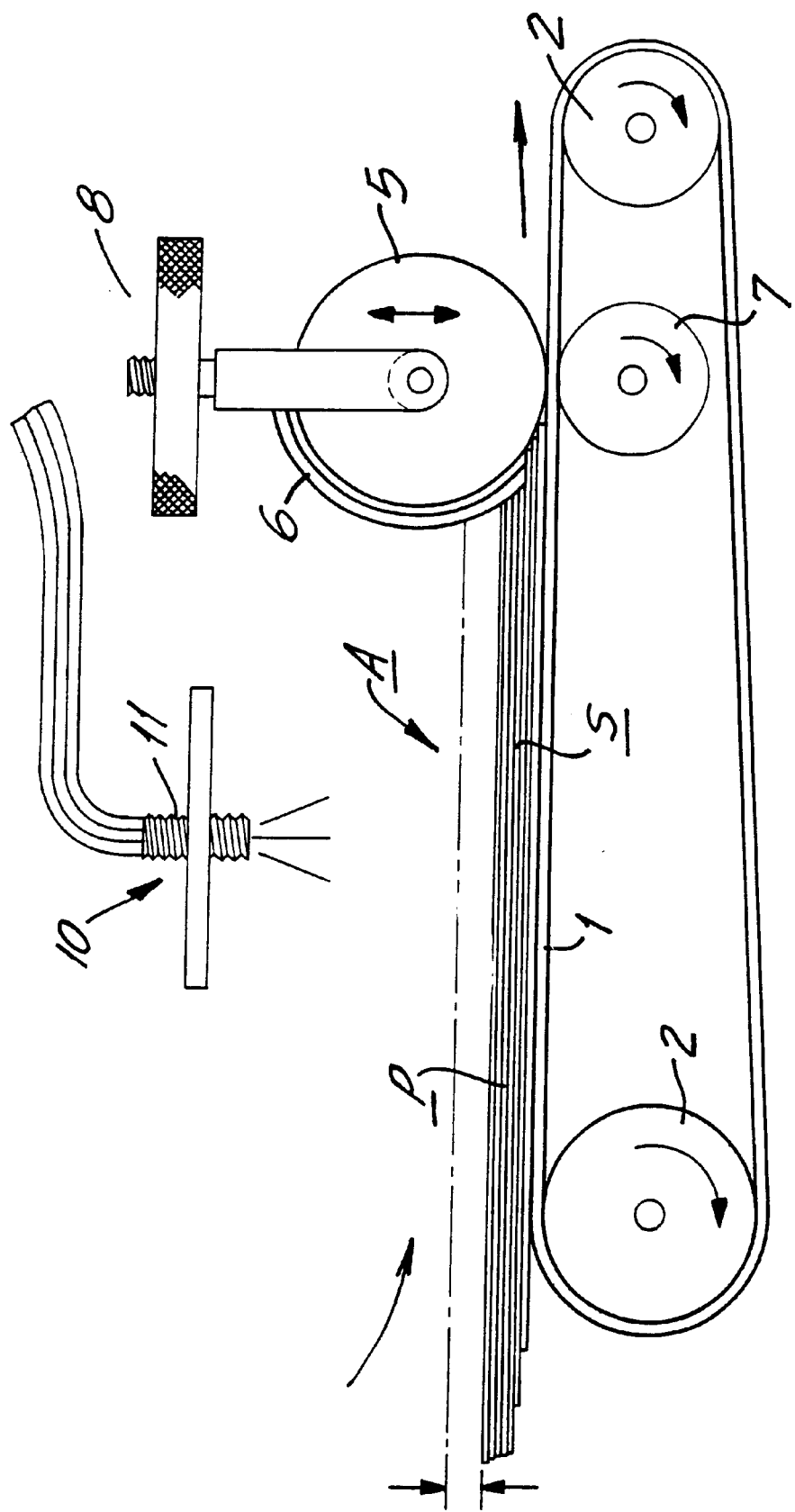

The present invention relates to a stack control mechanism for sheets of paper and more particularly to an improved means for controlling the height of a stack of paper sheets.

Sheets of paper are assembled in a stack in an accumulating area by a sheet feeding mechanism. After a predetermined number of sheets have been deposited into the accumulating area they are then fed out of the accumulating area one by one. When the stack reaches a certain height, the feeding into the accumulating area is stopped and when the height of the stack falls below a certain level, the feeding resumes. In current sheet feeding mechanisms, mechanical devices are used in conjunction with mechanical limit switches to detect paper stack height. As each sheet enters the accumulating area, the sheet is driven through and under a mechanical lever before it stops against a singulating roller.

With the recent use of lighter weight papers used for printing processes, the thickness of the traditional sheet has been reduced to the lower end of the standard. Hence, sheets of paper have less over all strength so that the rigidity of the papers is reduced. This results in paper buckling and if the sheets are interfered with by a mechanical sensing mechanism uneven shingling and irregular and double sheet feeding results. In addition, it has been found that print smudging of the sheets sometimes occurs in the singulation area. Controlling the stack height and keeping the paper to a minimum amount of sheets allows for lighter contact with the high friction surfaces of the singulation roller and the singulation indexing belt that the sheet is subjected to as it is pulled through and singulated from the stack. The stack weight resistance in combination with the high friction surfaces is one of the major causes of print smudging in mechanical feed devices in printing processes. In addition, presently used stack control mechanisms are complex to use and expensive and complex to manufacture and maintain.

OBJECTS

The present invention eliminates these drawbacks and has as one of its objects the provision of an improved stack control mechanism Another object of the present invention is the provision of an improved stack control mechanism in which the height of the stack is easily controlled.

Another object of the present invention is the provision of an improved stack control mechanism in which the height of the stack is controlled without the use of any mechanical means touching the sheets being accumulated.

Another object of the present invention is the provision of an improved stack control mechanism in which the number of sheets accumulated in the accumulating area are reduced to a minimum.

Another object of the present invention is the provision of an improved stack control mechanism which eliminates any smudging of printing on the sheets.

Another object of the present invention is the provision of a improved stack control mechanism which is simple to use.

Another object of the present invention is the provision of an improved stack control mechanism which is inexpensive and simple to manufacture and maintain.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein:

FIG. 1 is a diagrammatic side elevational view of a mechanism illustrating the present invention.

DESCRIPTION

Referring to the drawings, sheets P are fed from a feeding mechanism (not shown) and are accumulated in stack S in an accumulating area A which comprises a singulating belt driven by a pair of intermittently rotatable sheet feeding rollers 2. Located in front of the stack S is a stationary singulating retard roller 5 mounted over and spaced from the belt 1 so that a single sheet at a time passes therebeneath. A curved guard 6 is mounted in advance of the retard roller 5 to hold the sheet stack S in place in the accumulating area A. A support roller 7 is mounted beneath the retard roller 5 and on the underside of the belt 1. A height control assembly 8 is provided to adjust the height of the retard roller 5.

Sheets P accumulate in the accumulating area A on top of the belt 1 with the leading edges of the upper sheets P bear against the curved guard 6 while the edges of the bottom sheets P bear against retard roller 5. The sheets P are fed one-by-one by feed belt 1 beneath stationary retard roller 5. As each sheet P is being fed from the bottom, the height of the stack S is lowered.

A stack control assembly 10 is provided above the stack S for controlling the height of the stack S thereby controlling the weight of the stack S on the belt 1. The stack control assembly 10 comprises a sensing mechanism 11, which is preferably a reflection sensor, mounted above the stack S. The sensor 11 has a two point calibration sensing mechanism which emits vibrations or impulses against the stack S and receives the reflected impulses or vibrations from the stack S. This will determine the height of the stack S. As each sheet is being added or removed from the stack S, the sensing mechanism 11 will sense the height of the stack S. The vibrations or pulses are continuously emitted by sensors 11 against the stack and the reflected impulses or vibrations are continuously received by sensor 11. When a predetermined minimum amount of sheets P are in the stack S, the sensing mechanism 11 detects this and instructs the sheet feeding mechanism to feed more sheets P into the accumulating area A. When a predetermined maximum number of sheets are accumulated in the accumulating area A, sensing mechanism 11 also senses the height of the stack S and stops the feeding of the sheets until the stack has again reached the minimum height. It will be noted that with this reflective sensing mechanism 11 the sheets P are not touched by any mechanical sensing means. Hence, there is no buckling of the sheets, no smudging of the printing and no physical contact with the sheets being fed into the accumulating area.

It will thus be seen that the present invention provides an improved stack control mechanism in which the height of the stack is easily controlled, in which the height of the stack is controlled without the use of any mechanical means touching the sheets being accumulated, in which the number of sheets accumulated in the accumulating area are reduced to minimum, which eliminates any smudging of printing on the sheets, which is simple to use, and which is inexpensive and simple to manufacture and maintain.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A stack control mechanism comprising means for feeding sheets to an accumulating area, means for accumulating the sheets in the accumulating area in a stack, means for controlling the feeding of the sheets to said accumulating area, said controlling means comprising means for emitting an impulse or vibration onto that stack, means for receiving vibrations or impulses which are reflected from the stack, said feeding means being responsive to the controlling means to adjust to rate of feeding of sheets to the accumulating area.

2. A stack control mechanism as set forth in claim 1, wherein said controlling means comprises a sensor.

3. A stack control mechanism as set forth in claim 2, wherein said sensor comprises said emitting means and said receiving means.

4. A stack control mechanism as set forth in claim 3, wherein said sensor is mounted above the accumulating area.

5. A stack control mechanism as set forth in claim 4, wherein said emitting and receiving means is continuously in operation.

6. A stack control mechanism as set forth in claim 5, wherein means are provided to stop the feeding of the sheets into the accumulating area when the number of sheets in the accumulating area reach a first predetermined height and wherein means are provided to start the feeding of sheets into the accumulating area when the number of the sheets in the stack reach a second predetermined height.

* * * * *